United States Patent [19]

Gutshall

[11] 4,355,552

[45] Oct. 26, 1982

[54] RECESSED HEAD SCREW

[75] Inventor: Charles E. Gutshall, Rockford, Ill.

[73] Assignee: Technofast, Inc., Willowbrook, Ill.

[21] Appl. No.: 139,818

[22] Filed: Apr. 14, 1980

[51] Int. Cl.³ .............................................. F16B 23/00
[52] U.S. Cl. ...................................... 81/460; 411/404; 411/407; 411/408
[58] Field of Search ................ 411/402, 403, 404, 405, 411/406, 407, 408, 409, 410; 81/436, 448, 451, 460

[56] References Cited

U.S. PATENT DOCUMENTS

| Re. 24,878 | 9/1960 | Smith et al. | 411/404 |
|---|---|---|---|
| 2,084,079 | 6/1937 | Clark | 411/403 |
| 2,402,342 | 6/1946 | Phillips | 411/404 |
| 2,592,462 | 4/1952 | Phipard | 411/481 |
| 3,028,781 | 4/1962 | Muenchinger | 411/404 |
| 3,170,364 | 2/1965 | Johnson et al. | 411/404 |
| 3,295,572 | 1/1967 | Wing | 411/403 X |
| 3,409,058 | 11/1968 | La Pointe | 81/460 X |
| 3,831,648 | 8/1974 | Hill et al. | 81/460 X |
| 4,084,478 | 4/1978 | Simmons | 411/404 |

FOREIGN PATENT DOCUMENTS

| 403091 | 2/1967 | Australia | 81/448 |
|---|---|---|---|
| 279711 | 3/1952 | Switzerland | 81/448 |
| 383396 | 11/1932 | United Kingdom | 81/448 |
| 1420092 | 1/1976 | United Kingdom | 411/403 |

*Primary Examiner*—Thomas J. Holko
*Attorney, Agent, or Firm*—Merriam, Marshall & Bicknell

[57] ABSTRACT

A modified Phillips-type cruciform recess in a screw or the like, which provides a cling-fit with a driver by causing deflection of the flutes of the driver against the walls of the slot in the recess, comprises a central socket portion and radially extending slots adapted to receive the flutes of a suitable driving tool. Each slot is defined in part by a bottom surface of substantially uniform width which slopes radially inwardly and downwardly along the axis of the screw. The bottom surface joins two opposing surfaces which form the walls of the slot. The pairs of opposite slots in the cruciform pattern are not symmetrically located relative to a plane including the longitudinal axis of the screw, but are offset laterally in opposite directions with respect to such a plane. On insertion of a standard driver into the recess, the flutes of the driver are caused to flex into frictional engagement with the walls of the slots, thereby achieving the desired cling-fit.

10 Claims, 6 Drawing Figures

4,355,552

RECESSED HEAD SCREW

This invention relates to screw fasteners and the like, of the type having a cruciform recess in the head thereof. More particularly, the invention relates to an improved recess for use in the heads of such screws which provides a cling-fit of the fastener to a conventional driver.

BACKGROUND OF THE INVENTION

Screws and similar threaded fasteners having a head provided with a cruciform recess for engaging a driving tool, generally referred to as "Phillips head" or "Phillips-type" screws, are well-known and have been widely used in many commercial applications. In screws of this type, as exemplified in U.S. Pat. Nos. 2,046,839, 2,084,079, 3,025,396, 3,108,623 and 3,237,506, the recess comprises a central cavity and a plurality of radially extending slots which communicate with the central cavity. The corresponding driving tool comprises a like number of flutes which engage the slots in the head in a manner which tends to prevent slipping of the driving tool out of engagement with the screw, as can easily happen with a conventional screw having a single slot intended to be driven by a flat-bladed screwdriver.

In many commercial applications using Phillips-type screws, it is desirable that the screw maintain a cling-fit on the driving tool regardless of its orientation, thereby facilitating the installation of such screws in locations which may be difficult to reach. In order to achieve this result, the original design of the Phillips recess has been modified, as exemplified in U.S. Pat. Nos. 2,402,342, 2,474,994, 2,592,462 and 2,588,404, to provide frictional engagement between the screw head and the driving tool. In general, the frictional engagement between the tool and the screw head has been achieved by providing tapering mating surfaces on the driver and socket which produce a wedging action resulting in the desired cling-fit.

Screws of the Phillips type are conventionally produced by punching the preformed enlarged head of a suitable blank with a header punch, i.e., a punching tool having the contours of the desired recess. Since the recess which is produced must mate closely with a standard driver, the allowable variation in the size and shape of the recess which is punched in the head of the screw must be controlled within relatively narrow limits, particularly with regard to the surfaces intended to achieve the wedging action which produces a cling-fit of the screw to the driver. During a production run of fasteners, the surfaces of the header punch tend to wear, thus changing the shape or angle of the wedging surfaces in the recess and thus reducing or destroying the ability of a screw produced with the punch to achieve the desired cling-fit with a standard driver.

In order to facilitate removal of a header punch from a blank after the socket has been formed, it is conventional to provide a draft angle, i.e., to taper the socket-forming faces of the punch inwardly toward the bottom of the socket formed. In accordance with this objective, the surfaces of the punch which are desirably parallel, e.g., those forming the opposite sides of the slots in a Phillips-type recess, are nevertheless not made parallel, differing therefrom by a slight angle (draft angle) which facilitates removal of the punch from the head of the screw after it has been formed. The necessity for maintaining draft angles for production purposes further complicates the problem of properly forming the surfaces in the recess which are intended to achieve a cling-fit with a driver as a result of wedging action therebetween.

In my copending application Ser. No. 928,108, filed July 26, 1978, now U.S. Pat. No. 4,202,244, I have disclosed an improved Phillips-type recess in which a cling-fit is achieved between a driver and the screw by providing a surface in the recess which causes each flute of a standard driver to deflect against the sidewall of a slot. The cling-fit which is achieved is not dependent on a wedging action, as in the past, but by slight bending or distortion of the flute of the driver.

BRIEF DESCRIPTION OF THE DISCLOSURE

In accordance with the present invention, there is provided a modified Phillips-type recess in a screw or the like which provides a cling-fit with a driver by causing deflection of the flutes of the driver against the walls of the slot in the recess. The recess of the invention is generally cruciform in shape, similar to those of heretofore known Phillips-type sockets, and comprises a central portion having a wall which lies on a generally frustoconical surface. Radially extending from the central socket portion are a plurality of slots adapted to receive the flutes of a suitable driving tool. Each slot is defined by a bottom surface of substantially uniform width which slopes radially inwardly and downwardly along the axis of the screw. The bottom surface joins two opposing surfaces forming the walls of the slot. The pairs of opposite slots which form the cruciform pattern are not symmetrically located relative to a plane including the longitudinal axis of the screw, but are rather offset laterally in opposite directions with respect to such a plane. The contour of the recess of the invention, therefore, does not correspond to that of a standard driver in which the flutes have a 90° cross-bit configuration. On insertion of a standard driver into the recess of the invention, the flutes of the driver are caused to flex into frictional engagement with the walls of the slots, thereby achieving the desired cling-fit.

DESCRIPTION OF THE DRAWINGS

The invention will be better understood from the following detailed description thereof, taken in conjunction with the accompanying drawings, in which the same numerals are used to designate like elements in the different views, and in which:

As shown in FIGS. 1, 2 and 4, in a typical embodiment of the invention, a screw 10 is provided with a flat head 11 and a shank 12 leading to a threaded section (not shown). Head 11 is provided with a recess 13 comprising a central socket portion 14 which communicates with radially extending slots 16. A shallow annular groove or indent 17 encircling the periphery of socket portion 14 conceals the flash normally created during production of the screw and in addition serves to restrain defacing movement of a driver in the event it should cam out of the central recess.

Figure 1:
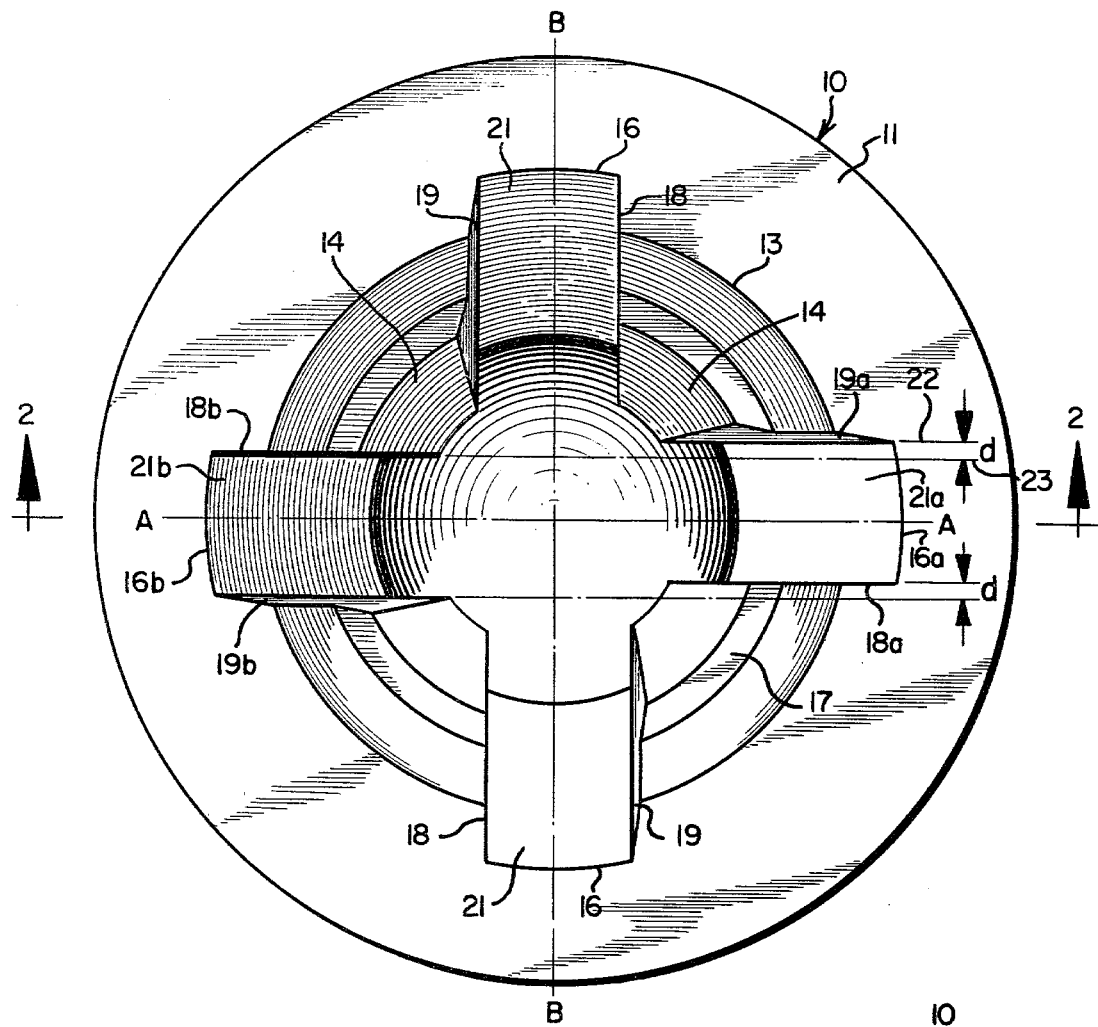
FIG. 1 is a top plan view of a flat head screw incorporating the socket of the invention.
Figure 2:
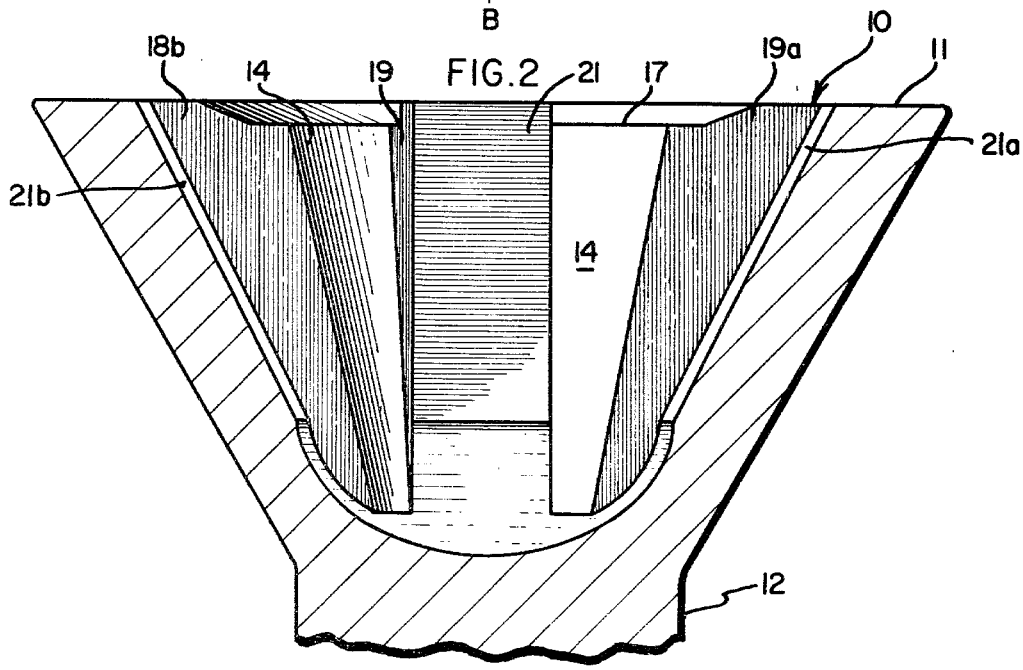
FIG. 2 is a cross-sectional view along the line 2—2 of FIG. 1.

Each slot 16 comprises two opposed generally parallel sidewalls 18 and 19 which are interconnected by a bottom surface 21 which slopes downwardly and inwardly along the axis of the screw and has a substantially uniform width. In order to provide a draft angle to facilitate removal of the header punch typically used in forming the socket, one of the sidewalls, i.e., 19, is bevelled slightly with respect to the other sidewall 18, which preferably lies in a plane parallel to the longitudinal axis of the screw. Sidewall 18 is accordingly at right angles to the direction of rotation of a driver used to drive screw 10 in the forward direction and thus limits the tendency of the driver to cam out of recess. The amount of cam angle provided in sidewall 19 has been exaggerated for purposes of illustration and is usually very small, on the order of 2°. By providing all of the cam angle on the rear (removal) sidewall 19 of the slot, camming of a driver out of the socket is inhibited in the forward (driving) direction, while such tendency is correspondingly increased in the opposite (removal) direction. It should be understood, however, that the location of the draft angles is not an essential aspect of the invention, since an appropriate draft angle can be provided on each of the walls, so that neither driving nor removal is favored, or provided solely on the driving wall 18, in order to facilitate removal of the screw, as may be desired or necessary. Although all of slots 16 are identical in size and shape, the slots in an opposite pair, e.g., 16a and 16b, are not symmetrically placed with respect to a plane including the longitudinal axis of the screw and generally parallel to the sidewalls in each slot. Rather, relative to such a plane, the slots in an opposite pair are laterally displaced in opposite directions. This construction is illustrated in FIG. 1. Considering the line A—A to represent the intersection of the screw head 11 with a plane at right angles to the plane of the figure and including the longitudinal axis of the screw, it will be seen that slot 16a is displaced upwardly, i.e., toward the top of FIG. 1, while slot 16b is displaced downwardly. Accordingly, the projection 22 of the upper edge of bottom surface 21a in slot 16a is not collinear with the projection 23 of the upper edge of bottom surface 21b of slot 16b, but rather is displaced therefrom by a distance d. Since each of surfaces 21a and 21b has the same width, the same displacement d occurs between the projections of the lower edges of the bottom surfaces in each slot, but in the opposite direction. The same offset also exists between the vertical slots in the figure, the upper vertical slot being displaced to the left while the lower slot is displaced to the right relative to a plane represented by line B—B.

Figure 3:
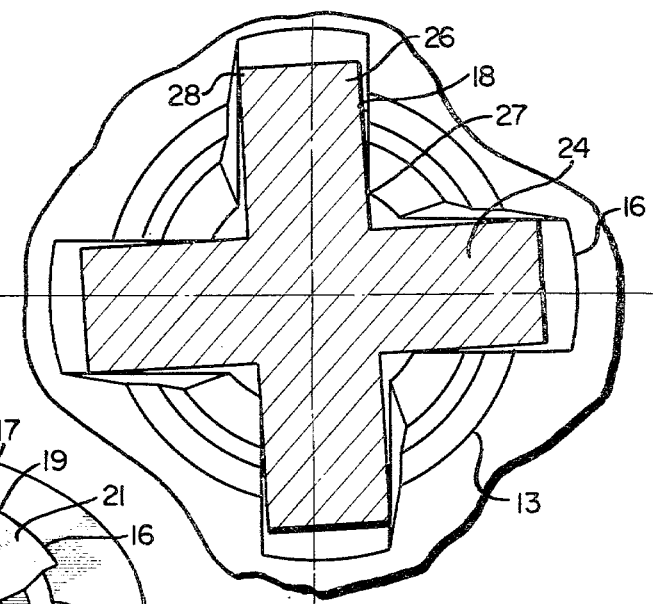
FIG. 3 is a detail of the socket portion of the screw of FIG. 1 showing its engagement with a conventional cross-bit driver.
Figure 4:
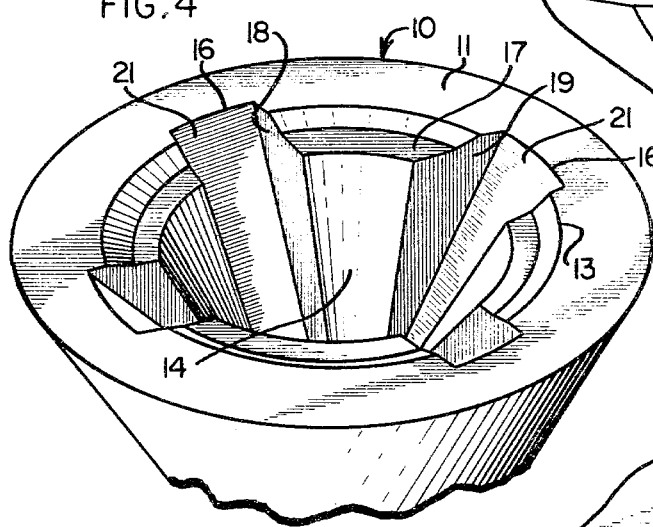
FIG. 4 is a perspective view of the screw head of FIG. 1.

It will be seen that because of the offset location of the opposite slots, a standard driver having flutes with a thickness corresponding to the width of each of bottom surfaces 21 can not be inserted into the socket shown in FIG. 1. By slightly enlarging the width of each bottom surface 21 relative to the thickness of the driver flutes, however, a standard driver can be inserted, as shown in FIG. 3, wherein the cross-section 24 of the driver is shown. Because of the offset between opposite slots, each flute, e.g. 26, of the driver will bear against the sidewalls of the slot at two points, i.e., at a point 27 close to the inner end of the flute and also at the outermost opposite extremity 28 of the flute. It will be seen further that these two points of contact exert a couple on flute 26 which tends to bend the outer end thereof in a clockwise direction sufficiently to permit the driver to be accommodated in the slot. The flutes of a standard driver are sufficiently thin and resilient to permit this deformation to occur. Once the driver 24 is fully inserted into recess 13, the resilient tendency of the flute to straighten out provides sufficient frictional engagement with the walls of the slot to maintain the screw in position on the driver. Further, on the application of a turning force to the driver in a tightening direction, flutes 26 will deflect into a position in full contact with driving wall 18, assuring proper driving of the screw.

In order to provide driver cling, it is not necessary that the flutes of the driver, e.g., 26 in FIG. 3, contact sidewalls 18 and 19 over the full depth of the slot. Accordingly, it is within the scope of the invention to provide a section in either or both sidewalls, adjacent the bottom of the slot which contacts the driver flute and to offset the upper remainder of the face. The offset portion of the sidewall effectively provides increased clearance for heavy plating thicknesses while assuring the desired driver cling.

In effect, the distortion of the flutes of a driver on insertion into the recess of the invention can be likened to the winding of a spring which applies sufficient force against the walls of the slot to maintain a cling-fit. At the same time, the spring-like action will accommodate a relatively wide range of variation or deviance from the optimum dimensions of either the socket or the driver such as might occur as a result of wear of the driver flutes in use, wear of the header punch during a production run of the screws, or varying thickness in any plating which might be applied to the screws after fabrication.

It should be understood that the configuration shown in FIG. 3 has been exaggerated for purposes of illustrating the invention. In actual practice, the offset distance d between opposite slots is small, suitably on the order of 0.002–0.0085 in. for screws up to 5/16 in. in diameter. Appropriate offset distances can readily be determined by those skilled in the art for use in any particular application.

Figure 5:
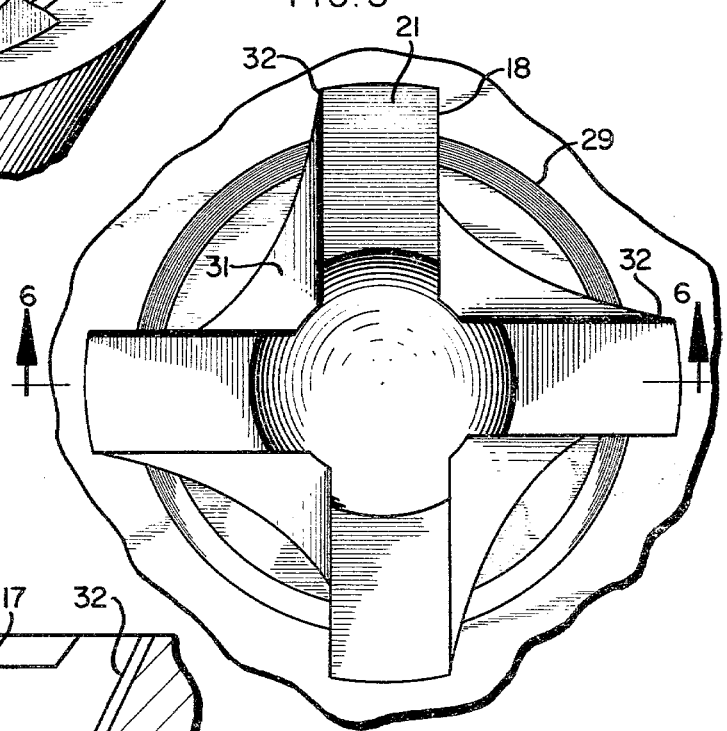
FIG. 5 is a top plan view of another embodiment of the recess of the invention provided with greatly enlarged draft angles.
Figure 6:
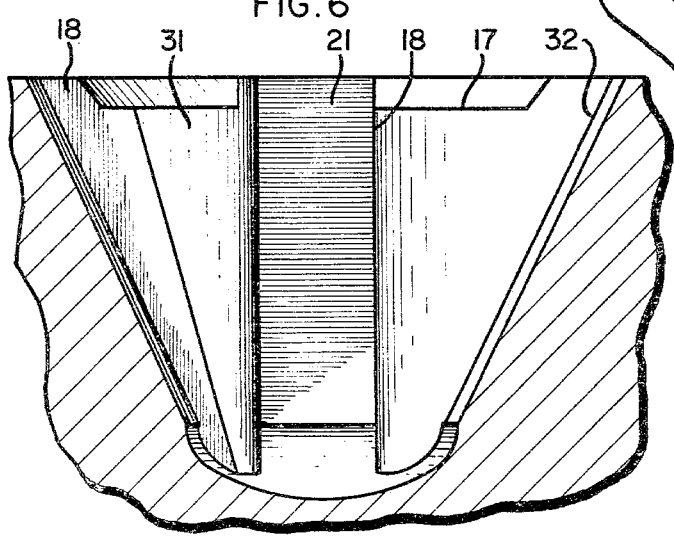
FIG. 6 is a cross-sectional view along the line 6—6 of FIG. 5.

FIGS. 5 and 6 show a modified version 29 of the recess of the invention, in which removal sidewall 31 has been provided with a very large draft angle in order to facilitate the manufacture of the punches used to form the screw. Although the large draft angle increases the possibility of camming of the driver in the removal direction, for many uses removability of the screw is not a significant consideration. The removability of the screw, even with the large draft angle shown, can be improved by forming sidewall 31 as a curved rather than a planar surface. At its junction 32 with bottom surface 21, curved face 31 becomes nearly parallel to opposite sidewall 18 and provides a sufficient bearing surface to permit removal of the screw with reasonable efficiency, if desired.

The foregoing detailed description has been given for clearness of understanding only, and no unnecessary limitations should be understood therefrom as modifications will be obvious to those skilled in the art.

What is claimed is:

1. A recessed head fastener having a recess including a central axially extending socket and a plurality of radially extending slots opening into said socket, each slot having a bottom surface of substantially uniform width interconnecting two opposed sidewalls;

said slots being arranged in diametrically opposite pairs, the slots in each pair being symmetrically offset in opposite directions with respect to a plane including the axis of the fastener, the offset distance between diametrically opposite pairs of said slots being within the range of 0.005 to 0.0085 inches and sufficiently small to permit the insertion into said recess of a driver having a plurality of radial flutes corresponding in number with said slots, said flutes being symmetrically spaced about the axis of said driver, insertion of said driver causing deflection of said flutes into frictional engagement with the walls of said slots, said engagement being sufficient to provide a cling fit of said fastener to said driver.

2. A fastener in accordance with claim 1 wherein said socket is generally conical.

3. A fastener in accordance with claim 2 comprising four said slots arranged in a cruciform pattern.

4. A fastener in accordance with claim 3 wherein at least one of the sidewalls of a slot is parallel to said plane.

5. A fastener in accordance with claim 4 wherein the other of said sidewalls of said slot is inclined relative to said plane.

6. In combination, a recessed head fastener having a recess including a central axially extending socket and a plurality of radially extending slots opening into said socket, each slot having a bottom surface of substantially uniform width interconnecting two opposed sidewalls;

said slots being arranged in diametrically opposite pairs, the slots in each pair being symmetrically offset in opposite directions with respect to a plane including the axis of the fastener, the offset distance being within the range of 0.005 to 0.0085 inches; and a driver insertable into said socket for driving said fastener, said driver having a plurality of radially extending flutes corresponding in number with said slots, said flutes being symmetrically spaced about and parallel to the axis of said driver;

insertion of said driver into said socket causing deflection of said flutes into frictional engagement with the walls of said slots, said engagement being sufficient to provide a cling fit of said fastener to said driver.

7. A fastener in accordance with claim 6 wherein said socket is generally conical.

8. A fastener in accordance with claim 7 comprising four said slots arranged in a cruciform pattern.

9. A fastener in accordance with claim 8 wherein at least one of the sidewalls of a slot is parallel to said plane.

10. A fastener in accordance with claim 9 wherein the other of said sidewalls of said slot is inclined relative to said plane.

* * * * *